US012280715B2

(12) United States Patent
Liu et al.

(10) Patent No.: US 12,280,715 B2
(45) Date of Patent: Apr. 22, 2025

(54) INTELLIGENT VEHICLE HORN (71) Applicant: International Business Machines Corporation, Armonk, NY (US)

(72) Inventors: Su Liu, Austin, TX (US); Hamid Majdabadi, Ottawa (CA); Shunguo Yan, Austin, TX (US); Michael Davis, Chesterfield, MO (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 18/459,554

(22) Filed: Sep. 1, 2023

(65) Prior Publication Data

US 2025/0074303 A1   Mar. 6, 2025

(51) Int. Cl.
G08G 1/0965 (2006.01)
B60Q 5/00 (2006.01)
G06V 20/56 (2022.01)
H04W 4/46 (2018.01)

(52) U.S. Cl.
CPC ............. *B60Q 5/005* (2013.01); *G06V 20/56* (2022.01); *H04W 4/46* (2018.02)

(58) Field of Classification Search
CPC .......... B60Q 5/005; G06V 20/56; H04W 4/46
See application file for complete search history.

(56) References Cited

U.S. PATENT DOCUMENTS 9,371,099 B2   6/2016   Lagassey
9,475,461 B1 *  10/2016  Pudiyathanda .... G08G 1/09675
9,483,941 B1   11/2016  Childress (Continued)

FOREIGN PATENT DOCUMENTS

FR   3103612 A1 *   5/2021   ............ B60Q 5/00
GB   2514267 A   11/2014

(Continued)

OTHER PUBLICATIONS

Anonymous, "Method and System for Inaudible Vehicle Honk", An IP.com Prior Art Database Technical Disclosure, IP.com No. IPCOM000246221D, IP.com Electronic Publication Date: May 17, 2016, 4 pages.

(Continued)

*Primary Examiner* — An T Nguyen
(74) *Attorney, Agent, or Firm* — Daniel M. Yeates (57) ABSTRACT

A computer-implemented method to send targeted messages based on a driver's intent. The method includes identifying, by a sending vehicle, one or more additional vehicles in the vicinity of the sending vehicle, including a first vehicle. Monitoring a set of data related to a current scenario for the sending vehicle and determining, based on a current scenario, an intent score for the sending vehicle. The method includes activating a horn device associated with the sending vehicle. The method further includes determining, in response to the activating, the intent score is above an intent threshold for the first vehicle. The method includes generating, in response to the intent score being above the intent threshold, a message; and sending, to a target vehicle, the message. Further aspects of the present disclosure are directed to systems and computer program products containing functionality consistent with the method described above.

20 Claims, 5 Drawing Sheets

(56) References Cited

U.S. PATENT DOCUMENTS

| | | |
|---|---|---|
| 9,734,714 B1 | 8/2017 | Fan |
| 2008/0018493 A1* | 1/2008 | Curtis ................... G08G 1/161 |
| | | 340/901 |
| 2008/0167820 A1 | 7/2008 | Oguchi |
| 2015/0002312 A1* | 1/2015 | Caskey ............... G08G 1/0965 |
| | | 340/902 |
| 2015/0170438 A1 | 6/2015 | Rosenbaum |
| 2018/0365993 A1 | 12/2018 | Makke |
| 2020/0114813 A1* | 4/2020 | Lujan ................... B60Q 1/0035 |
| 2021/0281986 A1* | 9/2021 | Zhu ..................... H04L 63/1425 |
| 2023/0140569 A1* | 5/2023 | Foster ............... B60W 60/0017 |
| | | 701/400 |
| 2023/0419679 A1* | 12/2023 | Donderici .............. G08G 1/017 |

FOREIGN PATENT DOCUMENTS

| | | | |
|---|---|---|---|
| IN | 202041005430 A | 2/2020 | |
| WO | 2013074983 A1 | 5/2013 | |
| WO | 2015134339 A1 | 9/2015 | |
| WO | WO-2018000218 A1 * | 1/2018 | ............. G08G 1/005 |

OTHER PUBLICATIONS

Dey et al., "Design of a Smart Real-time Excessive Honking Control System", IOSR Journal of Electrical and Electronics Engineering (IOSR-JEEE), e-ISSN: 2278-1676, p-ISSN: 2320-3331, vol. 14, Issue 6 Ser. I (Nov.-Dec. 2019), pp. 08-12, www.iosrjournals. org.

\* cited by examiner

| Time Line 305 | Position (x, y) 315 | Time Stamp 320 | Moving Direction 325 | Speed 330 | RoadID 335 | Horn Restriction Zone 340 | Horn Message 345 | Selected Receiver List 350 |
|---|---|---|---|---|---|---|---|---|
| Time-1 | NULL | NULL | NULL | NULL | NULL | NULL | NULL | NULL |
| Time-2 | X1, Y1 | 10:01:30am | North | 0 KM/H | Road001 | YES | "please move forward" | Vehicle002 |
| Time-3 | X2, Y2 | 10:01:45am | North+5 | 102 KM/H | Road001 | YES | "Too close to front vehicle" | Vehicle003 |
| Time-4 | X3, Y3 | 10:02:10am | North-10 | 101 KM/H | Road001 | YES | "Watch your right side" | Vehicle004 |
| Time-5 | X5, Y5 | 10:04:30am | North-15 | 110 KM/H | Road001 | No | "Pot Hole ahead" | Vehicle005 Vehicle006 |
| Time-6 | X6, Y6 | 10:04:45am | North+10 | 112 KM/H | Road001 | YES | "School Zone" | Vehicle005 Vehicle006 |
| Time-7 | X7, Y7 | 10:05:10am | North | 101 KM/H | Road001 | YES | "Kid in front" | Vehicle007 Vehicle008 Vehicle009 |

INTELLIGENT VEHICLE HORN

BACKGROUND

The present disclosure relates to vehicles, and, more specifically, to intelligent smart communication between vehicles.

Many modern vehicles have several modes of passing information between other vehicles. Various lights and sounds can be generated based on actions of passengers to provide information about the actions/intentions of one vehicle to other vehicles in the vicinity.

SUMMARY

Disclosed is a computer-implemented method to replace a general broadcast horn with a specific message targeted to a specific vehicle. The method includes identifying, by a sending vehicle, one or more additional vehicles in the vicinity of the sending vehicle, including a first vehicle. The method further includes monitoring a set of data related to a current scenario for the sending vehicle. The method also includes determining, based on a current scenario, an intent score for the sending vehicle. The method includes activating a horn device associated with the sending vehicle. The method further includes determining, in response to the activating, the intent score is above an intent threshold for the first vehicle. The method includes generating, in response to the intent score being above the intent threshold, a message; and sending, to a target vehicle, the message. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
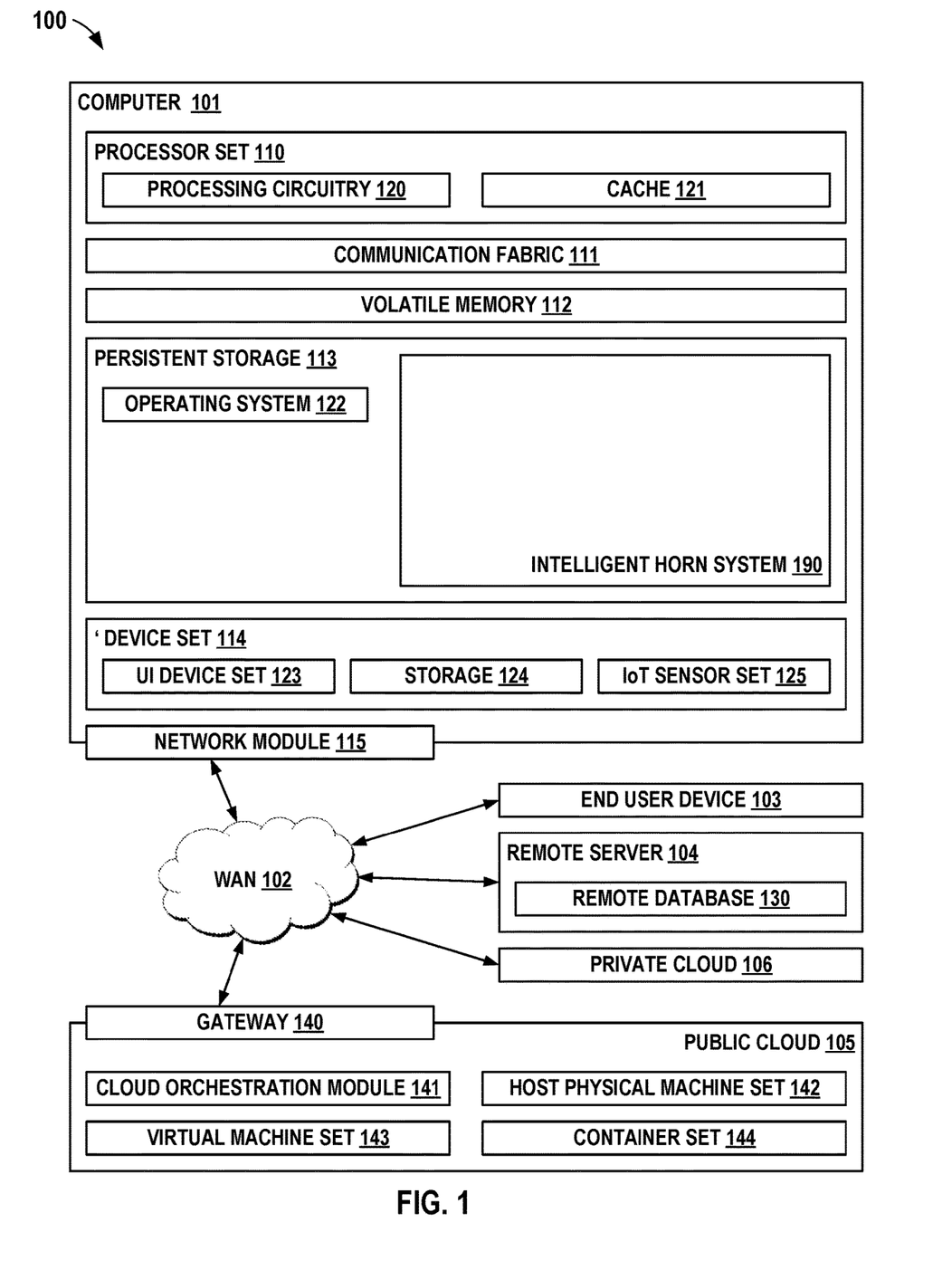
FIG. 1 is a block diagram of a computing environment suitable for operating an intelligent vehicle horn, in accordance with some embodiments of the present disclosure.

Computing environment 100 contains an example of an environment for the execution of at least some of the computer code involved in performing the inventive methods, such as intelligent horn system 190. In addition to intelligent horn system 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Intelligent horn system 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in intelligent horn system 190 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in intelligent horn system 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Many modern vehicles have several modes of passing information between other vehicles. Various lights and sounds can be generated based on actions of passengers to provide information about the actions/intentions of one vehicle to other vehicles in the vicinity. However, in general these indicators are provided to everyone generally, and nobody specifically. In many cases, when a driver intends to inform a particular vehicle/bystander of a specific intended message, there is no way to ensure that the intended recipient sees or hears the signal, understands the intended message, and/or is aware they are intended for the target even if they do see/hear it. Further, if a non-target of the signal interprets the message as being directed to them, it can cause confusion and at worst accidents and injury. For example, in one scenario a first driver honks a horn in a busy area intending to inform a second car that a stoplight both cars are waiting for is now green and the second car can start driving. A third and/or fourth vehicle can also hear the horn and perhaps unexpectedly stop. This can cause can an accident if a following car does not stop, or simply increase congestion and confusion.

In order to reduce noise pollution and confusion on roadways, embodiments of the present disclosure can generate and send targeted message to a particular vehicle in response to a driver activating a horn in a vehicle. The targeted message will only be heard by and/or displayed to vehicles/drivers that the initiator intends to inform of a specific scenario. The IHS will gather data from various sensors and Internet of Things (IoT) devices to determine what message and to whom the initiator is intending to send, and then deliver the message to only the intended recipients. Thus, other vehicles and pedestrians in the area can continue without disruption or confusion as to whether a horn was directed at them for an unknown reason.

Embodiments of the present disclosure can include an intelligent horn system ((HIS), or smart horn system). The smart horn system can gather, receiver, and analyze data to send a specific message to an intended target vehicle in response to an activation of a horn device on a sending vehicle. The smart horn system may eliminate or not sound the general broadcast horn, but rather send an audio or text type message to a target intended to be notified by the general broadcast horn. This can help to eliminate excess noise, and prevent unintended vehicles from taking unnecessary actions.

In some embodiments, the intelligent horn system includes a horn manager. The horn manager identifies additional vehicles and/or pedestrians in the vicinity of a sending vehicle. Each vehicle and/or pedestrian can have a horn manager either embedded in the vehicle and/or on a smart device associated with the vehicle/pedestrian. In some embodiments, the horn manager gathers data from one or more sensors in surrounding IoT devices, global positions system (GPS) devices, vehicle sensors, and other available data. The horn manager can use the gathered data to identify scenarios and expected actions for each vehicle/pedestrian.

In some embodiments, the horn manager can generate/calculate one or more confidence scores. The confidence scores can include an overall intent score, a zone score, a message score, and/or a target score. The scores represent a likelihood that an initiation of a horn device in a sending vehicle is intended to be a particular message in a particular vehicle, and that the general broadcast horn may not deliver the intended message.

In some embodiments, the horn manager can determine there is an activation of a horn device in the sending vehicle. The activation can be received by a horn input. In response to the horn input, the various confidence scores are compared against thresholds associated with the scores. If the confidence scores exceed their associated thresholds, the sending vehicle does not emit the general broadcast horn and sends a determined message to the determined target vehicle.

The aforementioned advantages are example advantages, and embodiments exist that can contain all, some, or none of the aforementioned advantages while remaining within the spirit and scope of the present disclosure.

Figure 2:
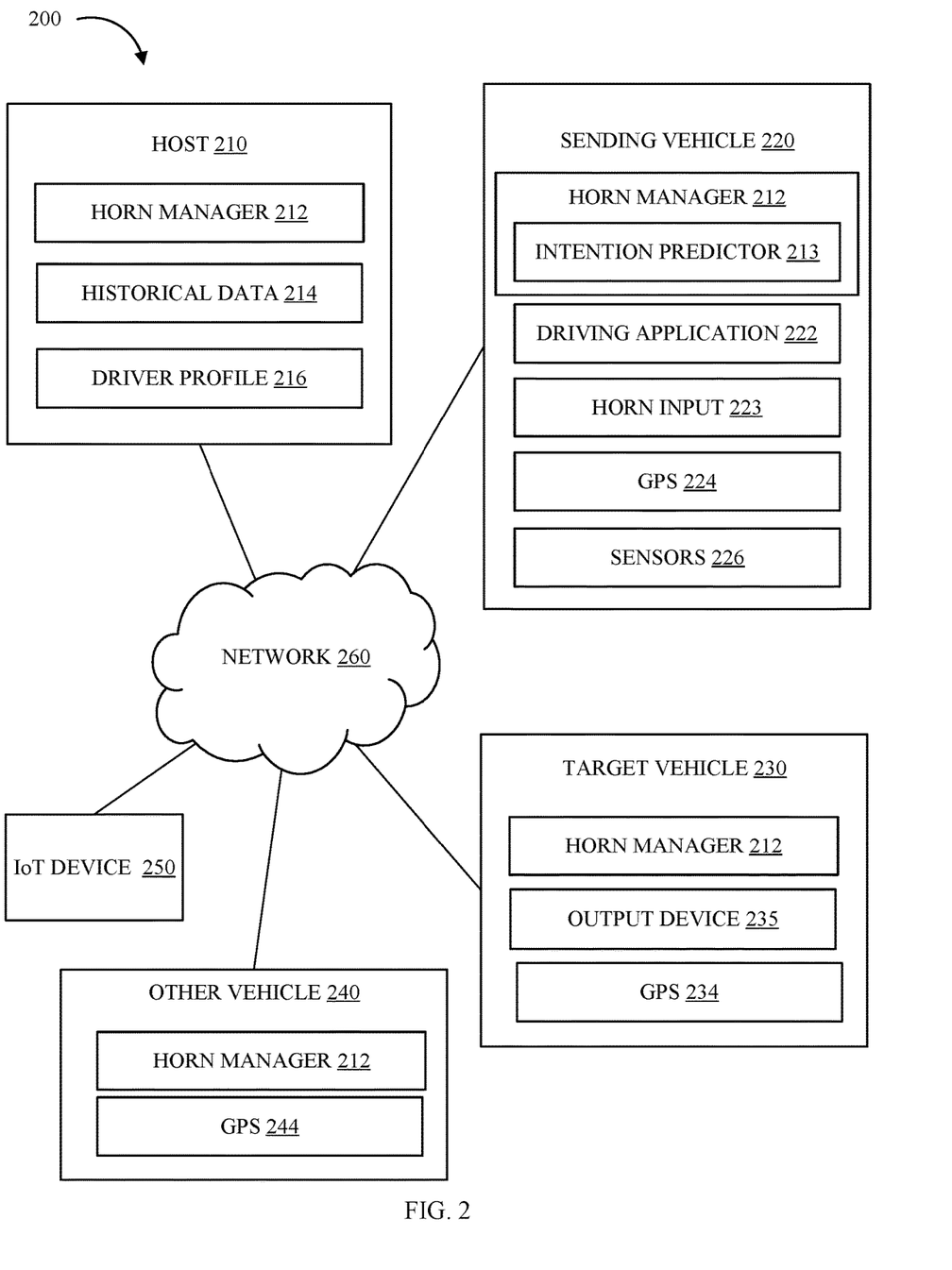
FIG. 2 is a block diagram of a computing environment suitable for operation of a horn manager in accordance with some embodiments of the present disclosure.

Referring now to various embodiments of the disclosure in more detail, FIG. 2 is a representation of a computing environment 200, that is capable of running a horn manager and/or intelligent horn system 190 in accordance with one or more embodiments of the present disclosure. Many modifications to the depicted environment may be made by those skilled in the art without departing from the scope of the disclosure.

Computing environment 200 includes host 210, sending vehicle 220, target vehicle 230, other vehicle 240, IoT device 250, and network 260. Network 260 can be, for example, a telecommunications network, a local area network (LAN), a wide area network (WAN), such as the Internet, or a combination of the three, and can include wired, wireless, or fiber optic connections. Network 260 may include one or more wired and/or wireless networks that are capable of receiving and transmitting data, voice, and/or video signals, including multimedia signals that include voice, data, and video information. In general, network 260 may be any combination of connections and protocols that will support communications between and among host 210, sending vehicle 220, target vehicle 230, other vehicle 240, IoT device 250, and other computing devices (not shown) within computing environment 200. In some embodiments, each of host 210, sending vehicle 220, target vehicle 230, other vehicle 240, IoT device 250, and other devices not shown may include one or more a computer system, such as computer 101 of FIG. 1.

For purposes of this application, sending vehicle 220, target vehicle 230, and other vehicle 240 can be interchangeable. At different times and/or locations each vehicle can include the functionality and perform any/all the functions of any of the vehicles. For example, in one scenario a first vehicle can send a message to a second vehicle, and in a different scenario the second vehicle can send a message to the first vehicle. In some embodiments, sending vehicle 220, target vehicle 230, and other vehicle 240 can include all and/or any subset of the components and/or subcomponents included in the other vehicles. The various components and/or subcomponents shown being associated with their respective vehicles are for discussion purposes. In some embodiments, there can be any number of sending vehicles 220, target vehicle 230, and other vehicles 240.

Sending vehicle 220 can be any engine powered vehicle. In some embodiments, sending vehicle 220 can be any machine that is propelled by an engine. Each vehicle can include one or more combustion and/or electric engines. The vehicle can be an automobile, a bicycle, an all-terrain vehicle, farm equipment, watercraft, and any other type of movable machine. In some embodiments, sending vehicle 220 has some level of automation/self-driving capability. Each vehicle can include a computing device to manage the automation of the vehicle. In some embodiments, sending vehicle 220 has a device configured to emit noise/warning to other vehicles and pedestrians in the vicinity of sending vehicle 220.

In some embodiments, sending vehicle 220 includes horn manager 212, intention predictor 213, driving application 222, horn input 223, GPS 224, and sensors 226.

Horn manager 212 can be any combination of hardware and/or software configured to convert a horn activation by a user into a directed message to a driver/passenger in a target vehicle. In some embodiments, horn manager 212 can identify one or more vehicles and/or pedestrians in the vicinity of sending vehicle 220. The identification can be based on data received from one or more sensors 226, IoT device 250, host 210, target vehicle 230, and/or other vehicle 240. In some embodiments, the identification is based on a relative distance between sending vehicle 220 and any/all other vehicles. In some embodiments, the identification is based on a communicative coupling between two or more vehicles. For example, any vehicle that determine the presence of another vehicle can establish a network connection through network 260.

In some embodiments, horn manager 212, determines an overall intent score (or intent score). The intent score can be based on or more of a zone score, a message score, and a target score weighted in any manner. In some embodiments, the overall intent score represents a likelihood a horn activation in sending vehicle 220 is based on the initiator attempting to send a particular message to a particular target. The initiator can be any person in sending vehicle 220, and/or driving application 222. In some embodiments, the zone score, the message score, and the target score are used independently of any intent score.

In some embodiments, horn manager 212 generates a zone score. The zone score represents a likelihood a general broadcast horn will be understood by an intended target. For purposes of this disclosure, a high zone score correlates to low chance of understanding. However, the relative values/inverse correlations can be adjusted by those skilled in the art. In some embodiments, the zone score is determined/calculated by intention predictor 213.

In some embodiments, as the number of potential targets increases, the zone score will increase. For example, in an area with relatively large number of vehicles and pedestrians, the general broadcast horn is less likely to be understood by the intended party. This would correlate to a higher zone score. Alternatively, if there are only 2 cars in an area, it much more likely the general horn will be understood by the intended target. This can correlate to a low zone score.

In some embodiments, the zone score is based on physical location. Some can have a relatively high zone score based on their context. For example, school zones, bus stops, pedestrian walkways, and other similar areas can increase the zone score. In some embodiments, some areas are designated as no-horn zones. The no-horn zone can correlate to a high and/or maximum zone score. The areas can be defined by a geofence and based on the physical location of sending vehicle 220. The designation can be a governmental designation and/or a system designation. The geofenced areas can be stored in historical data 214.

In some embodiments, the amount of ambient noise is an input into the zone score. For example, the louder an area is, the less likely a specific target is to hear and interpret a honk, thus, this results in a higher zone score. In some embodiments, time of day, day of week, weather, driver profiles, experience of drivers, level of vehicle automation, and other similar factors can be inputs into the zone score. The weighting between the various inputs (e.g., number of potential targets and ambient noise) can be weighted in any manner to determine the zone score.

In some embodiments, horn manager 212 generates a message score. The message score represents a likelihood a horn activation is tied to a specific event/message the driver would be trying to send. Generally, for purposes of this disclosure, the higher the message score, the higher the level of confidence sending vehicle 220 is intending to communicate a specific message. In some embodiments, the intent score can be based on the context of sending vehicle 220. Factors such as location, speed, direction of travel, driver, traffic, weather, and the like can affect the message score. In some embodiments, the message score can be based on a predetermined set of messages. The score can represent a likelihood that particular message is intended to be sent. The predetermined messages can be stored in historical data 214.

In some embodiments, horn manager 212 generates a target score. The target score represents a likelihood a horn initiator is intending to broadcast a horn to a particular vehicle/pedestrian. Horn manager 212 can generate a unique target score for each identified vehicle. The identified vehicle can include one or more target vehicle 230, and/or one or more other vehicle 240.

In some embodiments, the target score is correlated to a message score. For example, at one time, there may be two messages that have a relatively high message score. Consider an intersection where one direction has a green light with a vehicle stopped, and one direction has a red light with a vehicle moving. Based on this scenario, a horn activation can have a relative high message score for "the light is green" and "the light is red" respectively. The stopped car at the green light will have a high target score for "the light is green" and a low target score for "the light is red." The moving car would have the opposite target scores for the particular messages.

In some embodiments, two or more vehicles can be target vehicle 230 for a particular message. From the above example, if there is a second car stopped at the green light, "the light is green" message can have a high target score for both stopped cars.

In some embodiments, the scores can be based on comparing actions of the vehicles against an expected action. As the difference between the actual and expected increases, one or more of the scores will increase as well. The expected actions can be based on the determined conditions and/or based on conditions stored in historical data 214.

In some embodiments, horn manager 212 can generate a message. The message can be generated in response to one or more of the zone score, message score, target score, or total score being above an associated threshold. The generated message can be based on the message associated with the message score. In some embodiments, the message is generated in response to an activation of horn input 223. The message can be configured to communicate an audio clip and/or visual display of the message. The configuration can be based on one or more identified target vehicle 230.

In some embodiments, horn manager 212 sends the generated message to target vehicle 230. The sending can be in response to the target score being above a threshold. In some embodiments, the message is sent to target vehicle 230 with a highest (or any number of highest) target score related to a message score. In some embodiments, horn manager 212 can play/display a message received from a different vehicle. Additionally, a sent message can be configured to automatically play/display in target vehicle 230.

Intention predictor 213 can be any combination of hardware and/or software configured to determine an intent (or desired result) from activating a horn input 223 in sending vehicle 220. In some embodiments, intention predictor 213 can generate one or more of the zone score, the message score, the target score, and the overall intent score. Intention predictor can receive various inputs from any available data source to generate/update the various scores. In some embodiments, intention predictor 213 continuously updates each score based on changing inputs. In some embodiments, the scores are sent to horn manager 212. The sending can be in response to an activation of horn input 223. In some embodiments, the sending is in response to a change of any score.

In some embodiments, the inputs the score outputs are stored. The stored results and inputs can be sent to historical data 214. In some embodiments, intention predictor 213 includes one or more leaning models. There can an individual model for each score, a combined model for all scores, and/or any combination of one or more models for any number of the scores. The one or more models can be trained by data stored in historical data 214. In some embodiments, the models are updated as new data become available, and/or the data is refined/updated by user feedback.

In some embodiments, intention predictor 213 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, intention predictor 213 may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Driving application 222 can be any combination of hardware and/or software configured to automate at least a portion of sending vehicle 220. The automation can be any level of automation. In some embodiments, driving application 222 can automate one or more of accelerating, decelerating, maintaining velocity, maintaining distance, steering, changing lanes, parking, and the like. In some embodiments, the driving application can manage an automated function in the vehicle unrelated to driving. This can include turning on/off attached equipment, passenger comfort actions, communications, and the like.

In some embodiments, the automobile is fully automated. When fully automated, driving application 222 performs all functions to drive the vehicle such that a passenger/driver takes no actions and sending vehicle 220 continues to drive without user input. In some embodiments, the level of automation is very low, such that driving application 222 can perform a single action. For example, the automation can maintain an engine at a constant revolutions per minute (RPM) and/or a constant velocity. In some embodiments, the level of automation can be any level. Any function of driving can be performed by driving application 222.

In some embodiments, driving application 222 can have preset automation levels/modes. Each level can have a set of functions that are performed by the driving application 222. The various functions are not necessarily mutually exclusive and/or additive. In some embodiments, each level builds on the next lower level by adding at least one additional function to all of the functions of the lower levels. There can be any number of predefined levels.

Horn input 223 can be any combination of hardware and/or software configured to initiate a horn general broadcast. In some embodiments, horn input 223 can be received by sending vehicle 220 by a rider within the vehicle. The rider can initiate the input by taking an input action. Horn input 223 can be a button, knob, switch, voice activated, and the like. In some embodiments, horn input 223 can be configured to send in activation signal to horn manager 212 and/or to a sound emitted embedded with sending vehicle 220.

GPS 224 can be any combination of hardware and/or software configured to determine a location of vehicle 410. In some embodiments, GPS 224 can use one or more of satellites, triangulation, networks, and other similar methods to determine the location. In some embodiments, GPS 224 can track the geolocation of each vehicle. The location data can be sent to one or more of horn manager 212, driving application 222, and/or historical data 214.

Sensors 226 can be any combination of hardware and/or software configured to gather data within and/or surrounding a sending vehicle 220. Sending vehicle 220 can include any number of sensors and any number of types of sensors. In some embodiments, the type of sensor includes one or more of cameras, thermometers, heat detectors, moisture detectors, motion detections, microphones, distance detectors, and the like. The number and type of sensors can be configured to gather enough data to identify environmental and traffic conditions outside the vehicle, and the number of passengers and/or other relevant information from inside the vehicle. In some embodiments, the various sensors can be placed in various locations around and within the vehicle. In some embodiments, data from sensors 226 can be sent to horn manager 212. In some embodiments, the data from sensors 226 can be used to determine condition changes inside and outside the vehicle.

In some embodiments, sending vehicle 220, target vehicle 230, and/or other vehicle 240 utilize a smart device (e.g., smartphone) within a vehicle and/or a pedestrian. The smart device can be associated with a driver/passenger currently in the vehicle 220. The smart device can include all or some of the functionality of sending vehicle 220 and provide the capability to send the horn message to target vehicle 230. In these embodiments, the smart device can interface with sending vehicle 220 to send the message to target vehicle 230. The smart device can receive an input into horn input 223 and proceed as if it is integrated into the vehicle. The connection can be a wired and/or wireless network connection of any kind configured to allow communication between a smart device and a vehicle.

Target vehicle 230 can be any engine powered vehicle. In some embodiments, target vehicle 230 can be any vehicle identified as an intended target of a message from sending vehicle 220. The identification can be before and/or after initiation horn input 223. In some embodiments, target vehicle 230 can include all and/or any subset of the subcomponents of sending vehicle 220 and sending vehicle 220 can include all and/or any subset of the subcomponents of target vehicle 230. In some embodiments, target vehicle 230 can be any machine that is propelled by an engine. Each vehicle can include one or more combustion and/or electric engines. The vehicle can be an automobile, a bicycle, an all-terrain vehicle, farm equipment, watercraft, and any other type of movable machine. In some embodiments, sending vehicle 220 has some level of automation/self-driving capability. Each vehicle can include a computing device to manage the automation of the vehicle.

In some embodiments, other vehicles 240 can be a pedestrian not in a moving vehicle. The pedestrian can be adjacent to or near sending vehicle 220. In these embodiments, the personal computing device (e.g., smartphone) can receive and/or broadcast received messages. In some embodiments, the smart device can be located inside a vehicle, and the message can be broadcast from the device. This can be in addition to or instead of the message being broadcast by the components associated with the vehicle. In some embodiments, target vehicle 230 includes horn manager 212, output device 235, and GPS 234.

Horn manager 212 can be consistent with horn manager 212 in sending vehicle 220. In some embodiments, horn manager 212 can be a communication point between the two or more vehicles. Horn manager 212 can receive message data from sending vehicle 220. In some embodiments, horn manager 212 can interpret and broadcast a received message. The broadcast can be performed by output device 235. In some embodiments, horn manager 212 includes intention predictor 213 (not shown).

Output device 235 can be any combination of hardware and/or software configured to broadcast a received message to driver/passengers within target vehicle 230. In some embodiments, output device 235 can include an audible, and/or visual broadcast. For example, the received message can be displayed on a screen and/or played through a speaker system. In some embodiments, the type of broadcast can be based on the received message and/or the capabilities of target vehicle 230.

GPS 234 can be consistent with GPS 224.

Other vehicle 240 can be any engine powered vehicle. In some embodiments, other vehicle 230 can be any vehicle identified in the vicinity of sending vehicle 220. The vicinity can be any distance capable of hearing a horn from sending vehicle 220. In some embodiments, the vicinity can be a predefined distance (e.g., 300 yards). In some embodiments, the vicinity can be any vehicle identified by sending vehicle 220. The identification can be based on location (e.g., GPS data), sensor identification, connection to a network, and the like. The identification can be before and/or after initiation horn input 223. In some embodiments, other vehicle 240 can include all and/or any subset of the subcomponents of sending vehicle 220 and target vehicle 230, and sending vehicle 220 and target vehicle 203 can include all and/or any subset of the subcomponents of other vehicle 240. In some embodiments, other vehicle 240 can be any machine that is propelled by an engine. Each vehicle can include one or more combustion and/or electric engines. The vehicle can be an automobile, a bicycle, an all-terrain vehicle, farm equipment, watercraft, and any other type of movable machine. In some embodiments, sending vehicle 220 has some level of automation/self-driving capability. Each vehicle can include a computing device to manage the automation of the vehicle.

In some embodiments, target vehicle 230 includes horn manager 212 and GPS 244.

Horn manager 212 in sending vehicle 220 can be consistent with horn manager 212 in target vehicle 230. In some embodiments, horn manager 212 can be a communication point between the two or more vehicles. Horn manager 212 can send and/or receive data from sending vehicle 220 and/or target vehicle 230. In some embodiments, the data from other vehicle 240 can be in input into one or more of the intent score, the zone score, the message score, and the target score. Additionally, the data can be used to identify one or more vehicles/pedestrians in the vicinity, traffic patterns, weather, and the like. The data captured by sensors on other vehicles can be used by horn manager 212. In some embodiments, horn manager 212 includes intention predictor 213 (not shown).

In some embodiments, other vehicles 240 can be a pedestrian not in a moving vehicle. The pedestrian can be in a location adjacent to or near the street where sending vehicle 220 is located.

GPS 244 can be consistent with GPS 224 and/or GPS 234.

IoT device 250 can be any combination of hardware and/or software configured to gather data in the vicinity of sending vehicle 220. In some embodiments, any device that can capture and/or send data related to vehicle and pedestrian traffic patterns can be considered IoT device 250. In some embodiments, IoT device 250 can represent two or more separate IoT devices. Each IoT device 250 can have one or more sensors. The sensor can include cameras, heat sensors, motion detectors, and the like. In some embodiments, IoT device 250 continues network signals to determine the location. In some embodiments, IoT device 250 can be embedded into vehicles, personal electronic devices (e.g., smartphones, smartwatches, smart glasses, etc.), and infrastructure (e.g., stop lights, cameras, buildings).

In some embodiments, IoT device 250 may include computerized devices, such as personal computers, smartphones, servers, or the like. Two such devices may be networked together when one device is able to exchange information with the other device, whether or not they have a direct connection to each other. Two such devices may exchange data with each other using network 260.

In some embodiments, IoT device 250 sends data to horn manager 212. The data can be used as inputs into intent score, zone score, message score, and/or target score. In some embodiments, the IoT device 250 can include pre-existing devices (e.g., such as traffic pattern cameras) that are configured to send data to horn manager 212.

IoT sensor 252 can be consistent with sensors 226. In some embodiments, IoT device 250 includes any number of IoT sensor 252.

Host 210 can be a standalone computing device, a management server, a web server, a mobile computing device, or any other electronic device or computing system capable of receiving, sending, and processing data. In other embodiments, host 210 can represent a server computing system utilizing multiple computers as a server system, such as in a cloud computing environment (e.g., cloud environment 105 or 106). In some embodiments, host 210 includes horn manager 212, historical data 214, and driver profile 216. In some embodiments, host 210 can generate the scores for one or more vehicles as if it is sending vehicle 220. For example, if two different vehicles in the same vicinity both activated horn input 223 around a similar time, each vehicle can send the intended message to the other while receiving the message from the other vehicle.

In some embodiments, host 210 and/or all or some of its subcomponents can be included in one or more of sending vehicle 220, target vehicle 230, and other vehicle 240 in any combination.

In some embodiments, host 210 can receive all of the data into horn manager 212. Horn manager 212 can perform all the functions of sending vehicle 220. In these embodiments, an activation of horn input 223 is sent to host 210, and then host 210 cancels the general broadcast in sending vehicle 220 and generates and sends the appropriate message to target vehicle 230.

Horn manager 212 can be consistent with horn manager 212 in sending vehicle 220, target vehicle 230, and other vehicle 230. In some embodiments, host 210 can provide additional computational resources not available in a vehicle to process the sensor/location data from the various sources. In some embodiments, host 210, with horn manager 212 continuously and/or periodically update the intent score, the zone score, the message score, and the target score. The updates can be sent to the various vehicles. In some embodiments, the scores are sent in response to one or more scores exceeding the associated threshold. In some embodiments, horn manager 212 includes intention predictor 213 (not shown).

Historical data 214, can be data related to signal sending scenarios. In some embodiments, historical data 214 can include data that is input into one or more of the intent score, the zone score, the message score, and the target score. The data can include horn activations, the location/movement data for other vehicles, reactions to the activation, and the like. In some embodiments, historical data 214 can be training data for intention predictor 213. In some embodiments, historical data 214 includes how one or more users interact with vehicle 220 and/or different vehicles. In some embodiments, historical data 214 includes driving history for each driver profile 216. The driving history can include each driving session, level of automation used, controls that are utilized, information that is viewed, manual changes to any display, environmental conditions, passenger data while driving (and changes for each other category when with passengers), and the like. The driver profile 216 can use data within historical data 214 to generate and/or update preferences, manual changes, and/or an experience level for each driver profile 216 and the associated driver.

Driver profile 216 can include information about one or more drivers/passengers of sending vehicle 220, target vehicle 230, and/or other vehicle 240. In some embodiments, driver profile 216 can include a plurality of data for a driver. In some embodiments, driver profile 216 includes two or more profiles for two or more drivers. The profile can be shared for multiple vehicles. Each particular vehicle can have data unique to that vehicle 220 related to the functionality of the vehicle and the preferences of the driver. In some embodiments, driver profile 216 can include an experience level and/or skill level for the driver. In some embodiments, driver profile 216 can include any number of unique profiles for individual drivers.

Figure 3:
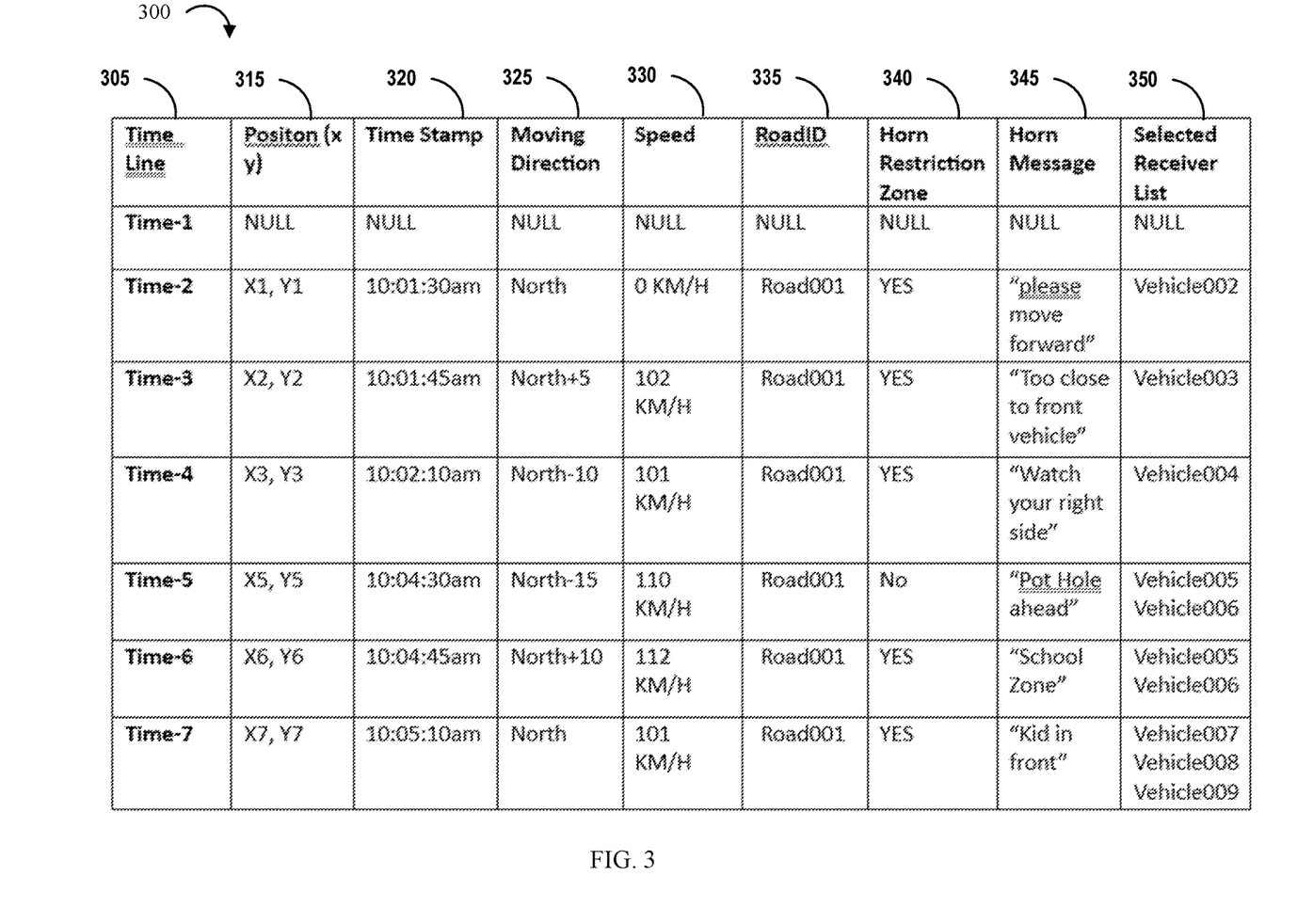
FIG. 3 is a table showing relevant data for determining intent for a horn use, in accordance with some embodiments of the present disclosure.

FIG. 3 includes one example embodiment of data that can be captured for a sending vehicle. FIG. 3 includes table 300 with columns identifier 305, position 315, time stamp 320, moving direction 325, speed, 330, road ID 335, horn restriction zone 340, message 345, receiver (target) 350. In some embodiments, additional data that is not shown can be included. For example, there can be additional tables and/or columns can include vehicle id, driver id, the scores, and other relevant data. As shown, for a particular time (e.g., row) the table 300 shows a set of relevant data related to location, what an intended message can be, and potential targets. Additionally, table 300 shows how each of these can change as the context of the vehicle changes.

Figure 4:
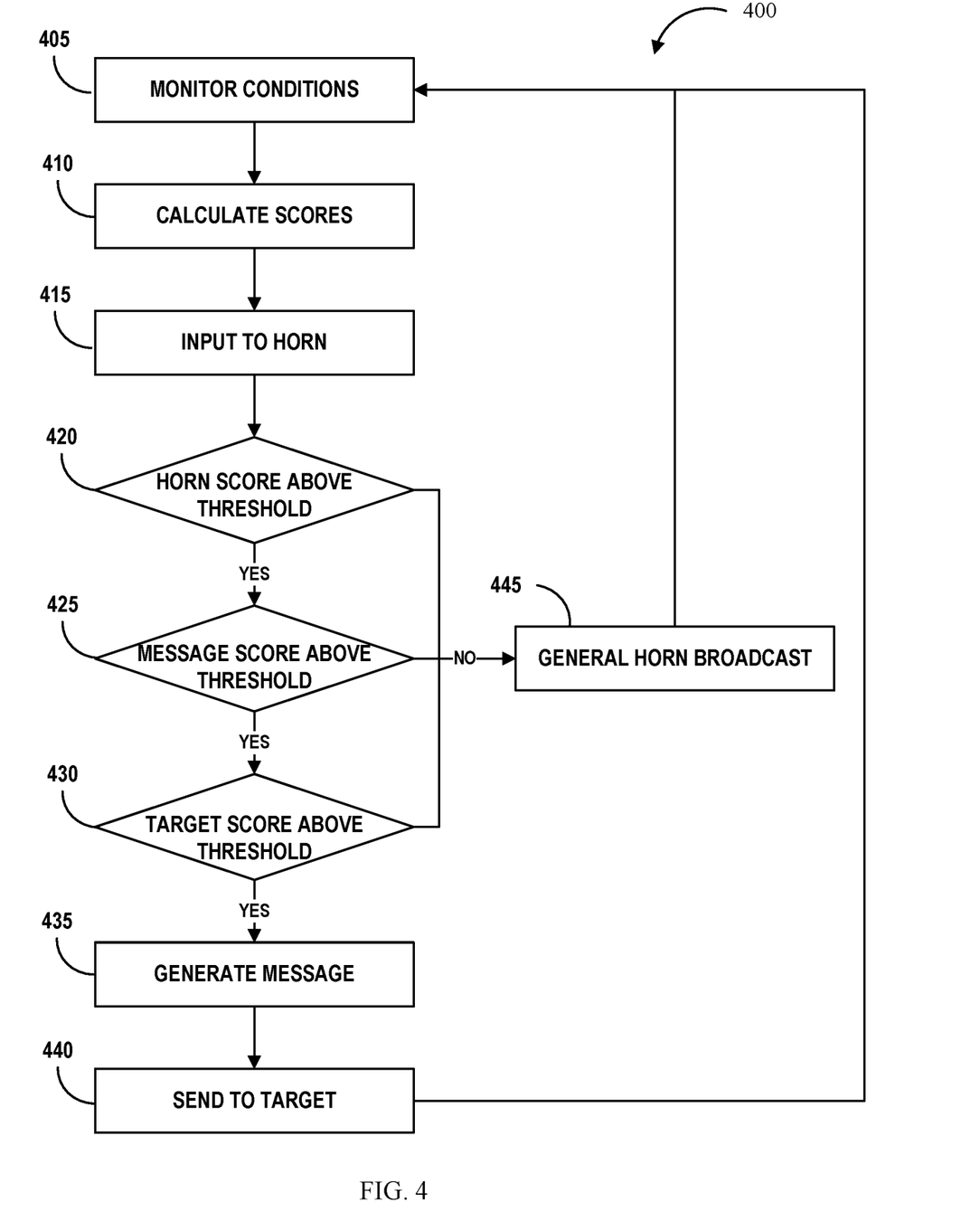
FIG. 4 is a flow chart of an example method to replace a general broadcast horn with a specific message to a specific recipient, in accordance with some embodiments of the present disclosure.

FIG. 4 is a flowchart of an example process 400 for replacing a general broadcast horn with a specific message sent to a particular target (e.g., computing environment 100 and/or computing environment 200). One or more of the advantages and improvements described above for updating a display in a vehicle may be realized by process 400, consistent with various embodiments of the present disclosure.

Process 400 can be implemented by one or more processors, host 210, horn manager 212, historical data 214, driver profile 216, sending vehicle 220, driving application 222, horn input 223, GPS 224, sensors 226, target vehicle 230, output device 235, other vehicle 240 and IoT device 250 and/or a different combination of hardware and/or software. In various embodiments, the various operations of process 400 are performed by one or more of host 210, horn manager 212, historical data 214, driver profile 216, sending vehicle 220, driving application 222, horn input 223, GPS 224, sensors 226, target vehicle 230, output device 235, other vehicle 240 and IoT device 250. For illustrative purposes, the process 300 will be described as being performed by horn manager 212. For discussion purposes, method 400 will be described as being from a perspective of sending vehicle 220 and sending a message to target vehicle 230 in the vicinity of other vehicle 240.

However, in various embodiments, any of the vehicles can perform any functions described in the method. Further, each of sending vehicle 220, target vehicle 230, and other vehicle 240 can represent one or more individual vehicles and/or pedestrians. In some embodiments, host 210 can coordinate the operations of method 405.

At operation 405, horn manager 212 monitors driving conditions. In some embodiments, the monitoring includes identifying one or more vehicles in the vicinity of sending vehicle 220. The vicinity can be a predetermined distance. In some embodiments, the vicinity can incorporate any vehicle that is connected to network 260 and/or any vehicle with a computing device (e.g., smartphone) in the vehicle connected to network 260. In some embodiments, the vicinity of sending vehicle 220 includes a set of closest vehicles. The set of closest vehicles can be any predetermined number of vehicles. For example, the five vehicles geometrically closest to sending vehicle 220 can be considered in the vicinity. The set of closest vehicles can be limited to moving/running vehicles. From the above example, if a car is parked, it can be excluded from the set of closest vehicles, while a moving vehicle at a further distance can be included.

In some embodiments, the vicinity can be based on driving conditions. For example, only vehicles driving on the same road and/or same directions can be considered in the vicinity. In some embodiments, the vicinity can be based a target score. For example, any vehicle with any target score above a threshold can be considered in the vicinity. The vehicles in the vicinity can frequently change as conditions change.

In some embodiments, the monitoring includes monitoring for and/or identifying driving conditions. The driving conditions can include traffic signals/signs, location, type of road (e.g., highway vs. neighborhood), number of vehicles/pedestrians, ambient noise, weather, and the like. The conditions can be determined/monitored based on received data. Data can be received from one or of sensors 226, GPS 224, target vehicle 230, other vehicles 240, and IoT device 250. The data can be received and analyzed by intention predictor 213.

At operation 410, horn manager 212 determines one or more scores. In some embodiments, the scores can include one or more of the overall intent score, the zone score, the message score, and the target score. The overall intent score can represent a determined likelihood that an initiator of horn input 223 intents to send a particular message to target vehicle 230. The intent score can be based the monitoring of operation 405. In some embodiments, the intent score is generated by intent predictor 213. The intent score can be based on the received data in operation 405.

In some embodiments, the intent score is comprised of the zone score, the message score, and the target score. The zone score, message score, and target score can be weighted in any manner to generate the overall intent score. In some embodiments, the zone score, the message score, and the target score are calculated independently from the intent score. Said differently, in these embodiments, there is no overall intent score, but rather the other three scores are generated individually.

In some embodiments, operation 410 includes generating the zone score. In some embodiments, the zone score represents a likelihood a general broadcast horn will be understood by an intended target. In some embodiments, the zone score is generated by intent predictor 213. In some embodiments, the zone score can be based on the location and/or the monitored conditions. In some embodiments, the zone score is based on area designated as a no horn zone. For example, a city may enact an ordinance that prohibits honking in the vicinity of certain landmarks/building.

In some embodiments, operation 410 includes generating the message score. The message score represents a likelihood a horn activation is tied to a specific event/message the horn initiation is trying to address/send. In some embodiments, the message score is generated by intent predictor 213. The message can be selected from a predetermined set of messages. The set of messages can be stored in historical data 214. In some embodiments, the message is generated based on the conditions. In some embodiments, the message score is based on comparing the monitored conditions to an expected condition. For example, if a stop light is green and a vehicle is expected to move but is not, the message can be related to a request the stopped vehicle begin to move. In some embodiments, horn manager 212 can generate two or more message scores concurrently. Each potential message can have a unique/induvial message score. For example, continuing the previous example, a first message can be "please accelerate" and a second message can be "the light is green".

In some embodiments, operation 410 includes generating the target score. The target score represents a likelihood a horn initiator is intending to broadcast a horn to a particular vehicle/pedestrian, in this scenario target vehicle 230. In some embodiments, the target score is generated by intent predictor 213. In some embodiments, the target score can be based on the monitored driving conditions. In particular, the target score is based on the actions/situation of target vehicle 230 and/or other vehicle 240. As target vehicle 230 deviates from an expected action, it can cause the target score to increase for that vehicle.

In some embodiments, the target score is associated with a specific message score. For each potential message, there is a target score for each identified vehicle and/or each vehicle in the vicinity of sending vehicle 220. This can lead to generating multiple target scores for a single vehicle (e.g., other vehicle 240). In some embodiments, horn manager 212 generates a single target score for each vehicle in the vicinity. The single score can represent the likelihood of being a target for any/all of the potential messages rather than a particular message.

At operation 415, horn manager 212 activates a horn device. The activation can be received by horn input 223. In some embodiments, the input is received from a driver/passenger in sending vehicle 220. The input can be pushing a button, flipping a switch, an audible command and the like.

At operation 420, horn manager 212 determines if the horn score is above horn threshold. The horn threshold can be static and/or dynamic. In some embodiments, the horn threshold can be updated. In some embodiments, the horn threshold is based on location. For example, if in a designated no horn zone, then the threshold can be very low or zero, so at any time the horn score is above the horn threshold. If the horn score is above/exceeds the horn threshold (420: YES), then horn manager 212 proceeds to operation 425. If the horn score is not above the horn threshold (420: NO), then horn manager 212 proceeds to operation 445.

At operation 425, horn manager 212 determines if the message score is above/exceeds a message threshold. The message threshold can be static and/or dynamic. In some embodiments, the message threshold can be updated. In some embodiments, each message can have a unique/individual message threshold. The message threshold can be based on the message and/or the scenario. For example, if there is a traffic jam, and the message is "Please start moving", but target vehicle 230 would be unable to move, that can increase the message threshold for that particular message. If the message score is above/exceeds the message threshold (425: YES), then horn manager 212 proceeds to operation 430. If the horn score is not above the horn threshold (425: NO), then horn manager 212 proceeds to operation 445.

At operation 430, horn manager 212 determines if the target score is above/exceeds a target threshold. The target threshold can be static and/or dynamic. In some embodiments, the target threshold can be updated. In some embodiments, each target can have a unique/individual target threshold. In some embodiments, each target can have multiple target thresholds, one for each potential message. The target threshold can be based on the message and/or the scenario. For example, if there is a traffic jam, and the message is "Please start moving", but target vehicle 230 would be unable to move, that can increase the target threshold for that particular message. If the target score is above/exceeds the message threshold (430: YES), then horn manager 212 proceeds to operation 435. If the horn score is not above the horn threshold (430: NO), then horn manager 212 proceeds to operation 445.

At operation 435, horn manager 212 generates the message. In some embodiments, the generation includes generating the message in a format that can be sent/displayed/played to target vehicle 230. In some embodiments, the generation includes receiving/obtaining the message from host 210/historical data 214.

At operation 440, horn manager 212 sends the message. In some embodiments, the message is sent to target vehicle 230. In some embodiments, the message is configured to automatically be broadcast to passengers of target vehicle 230. The broadcast can be an audio and/or visual display. Upon completion of operation 440, horn manager 212 returns to operation 405.

At operation 445, horn manager 212 emits a general horn broadcast. In some embodiments, the confidence of a specific intent/target is not sufficient to eliminate the general broadcast and/or identify a particular target. In some embodiments, horn manager 212 prevents the general broadcast but also does not send a message. For example, if the horn score is above the horn threshold, but the target score and/or message score do not exceed their associated threshold a general horn broadcast can still be detrimental. The vehicle may be in a no horn zone and/or the horn could cause an action from an unintended driver resulting in an accident or injury. So, horn manager 212 can eliminate the excess noise. In this embodiment, horn manager 212 can send a message to the horn initiator indicating no message was sent.

In some embodiments, horn manager 212 can send two or more messages in response to a single activation of horn input 223. The two or more messages can be the same messages to different vehicles, different messages to different vehicles, two messages to the same vehicle, and/or any combination of these.

Figure 5A:
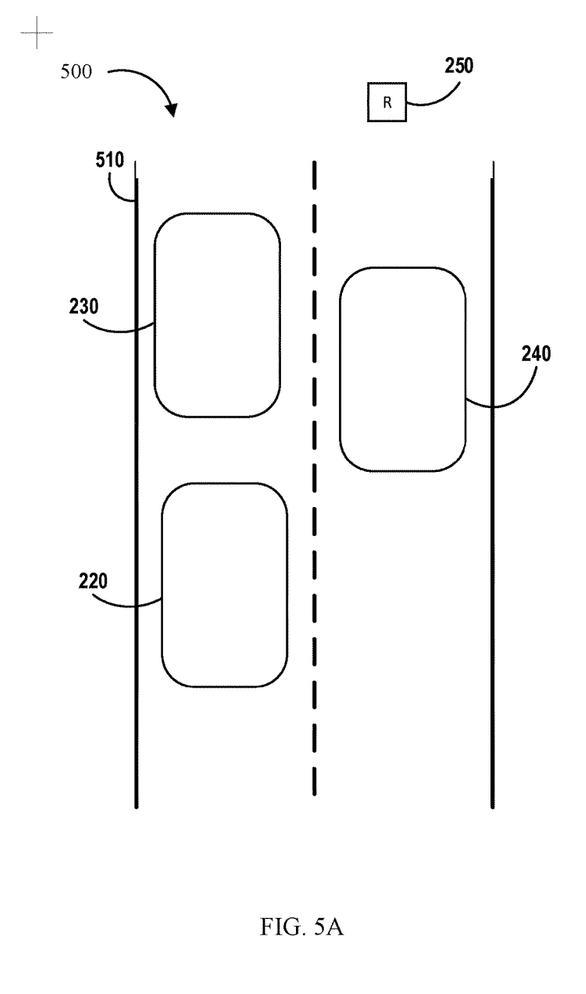
FIGS. 5A and 5B pictorial diagrams that are illustrative example of intelligent horn system use scenario, in accordance with some embodiments of the present disclosure.
Figure 5B:
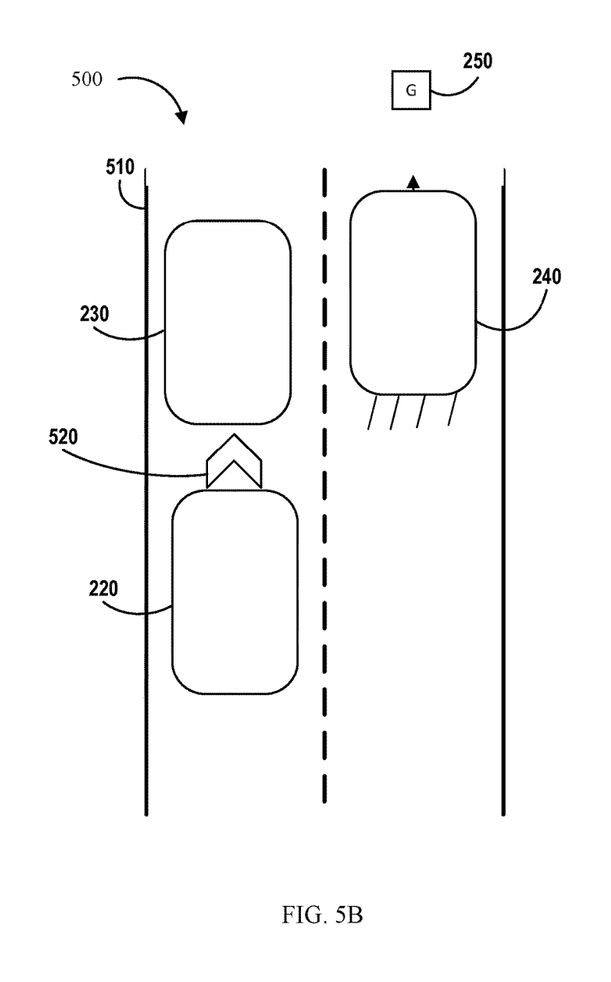

FIGS. 5A and 5B include a driving environment 500 to show one embodiment of the method 400. Driving environment 500 is shows from a top down view. FIG. 5A includes sending vehicle 220, target vehicle 230, other vehicle 240, on road 510 and IoT device 250. In this example, IoT device 250 is a stoplight. In FIG. 5A, all vehicles are at rest and the stoplight is showing red. In this scenario, sending vehicle 220 can identify target vehicle 230 and other vehicle 240 as being in the vicinity, and generate a network connection between the vehicles. At the point in time of FIG. 5A all vehicles are acting as expected, so it will likely correlate to low zone score, message score, and target score.

FIG. 5B includes the same vehicles and components as FIG. 5A, but the stoplight is now showing green. Other vehicle 240 is moving forward in response to the green light, but target vehicle 230 remains motionless. The movement or lack of movement can be determined by one or more of a sensor in any vehicle or IoT device 250, and/or GPS 245. The changed light can be determined by sensors of one or more vehicle and/or the indication data from IoT device 250 can be shared with the vehicles. As the light changes to green and other vehicle begins to move, intent predictor 213 can continuously update the various scores. As other vehicle 240 moves further and the amount of time target vehicle 230 remains motionless, the actual action begins to be different than expected actions. Additionally, this can cause each of the scores to increase. The zone score can increase because a general broadcast horn may cause other vehicle 240 to stop, which would be an unintended action. The message score for a message of "the light is green" or "you can begin accelerating" or similar will increase because that is a likely intended message a driver of sending vehicle 220 would like to send. The target score for target vehicle 230 will increase as they are the likely target of any associated message. At the same time, the target score for other vehicle 240 can remain low, as the messages are irrelevant to the actions of other vehicle 240.

At the time of FIG. 5B, horn input 223 is activated. Horn manager 212 will compare the current zone score, message score, and target score to their associated threshold, and in response to the scores exceeding each threshold, send the message 520 to target vehicle 230. The message can be played/displayed to target vehicle 230, notifying the occupants they can begin to drive.

Embodiments of the present disclosure can increase driver safety by sending specific messages to particular recipients cutting down on noise pollution and preventing unexpected actions from driver/pedestrians that hear a sudden horn blast.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by a sending vehicle, one or more additional vehicles in a vicinity of the sending vehicle, including a first vehicle;
   monitoring a set of data related to a current scenario for the sending vehicle;
   determining, based on the current scenario, an intent score for the sending vehicle;
   activating a horn device associated with the sending vehicle;
   determining, in response to the activating, the intent score is above an intent threshold for the first vehicle;
   generating, in response to the intent score being above the intent threshold, a message; and
   sending, to a target vehicle, the message.

2. The computer-implemented method of claim 1, wherein the intent score represents a confidence of a user in the sending vehicle that intends to send a particular message to a particular target.

3. The computer-implemented method of claim 2, wherein the intent score includes a zone score that represents a likelihood the particular target will correctly interpret the particular message, a message score that represents the particular message is intended to be sent by the user, and a target score that represents that the user intends the particular target to receive the particular message.

4. The computer-implemented method of claim 3, wherein the generating the intent score includes generating the intent score for each of the one or more additional vehicles.

5. The computer-implemented method of claim 4, wherein the intent score includes generating the message score for two or more potential messages and two or more target scores, and each of the two or more target scores is based on and associated with one of the two or more message scores.

6. The computer-implemented method of claim 1, wherein the set of data is received from the sending vehicle, the one or more additional vehicles, and at least one Internet of Things device.

7. The computer-implemented method of claim 1, further comprising:
   preventing, in response to the intent score being above the threshold, the horn device from sounding a general broadcast horn, wherein the horn device is configured to make a noise in response to the activation.

8. The computer-implemented method of claim 1, further comprising:
   determining, based on the current scenario, an expected action for the one or more additional vehicles, wherein the intent score is based on a difference between the expected action of the first vehicle and an actual action of the first vehicle.

9. The computer-implemented method of claim 1, further comprising:
   receiving a second activation of the horn device at a second time;
   determining a second intent score for the second time is below the threshold; and
   sounding, in response to the second intent score being below the threshold, the general broadcast horn.

10. The computer-implemented method of claim 1, wherein the intent score is generated by an intent predictor that includes at least one learning model.

11. A system comprising:
a processor; and
a computer-readable storage medium communicatively coupled to the processor and storing program instructions which, when executed by the processor, are configured to cause the processor to:
- identify, by a sending vehicle, one or more additional vehicles in a vicinity of the sending vehicle, including a first vehicle;
- monitor a set of data related to a current scenario for the sending vehicle;
- determine, based on the current scenario, an intent score for the sending vehicle;
- activate a horn device associated with the sending vehicle;
- determine, in response to the activating, the intent score is above an intent threshold for the first vehicle;
- generate, in response to the intent score being above the intent threshold, a message; and
- send, to a target vehicle, the message.

12. The system of claim 11, wherein the intent score represents a confidence that a user in the sending vehicle intends to send a particular message to a particular target.

13. The system of claim 12, wherein the intent score includes a zone score the represents a likelihood the particular target will correctly interpret the particular message, a message score that represents the particular message is intended to be sent by the user, and a target score that represents the user intends the particular target to receive the particular message.

14. The system of claim 11, wherein the program instructions, when executed by the processor, are further configured to the processor to:
- determine, based on the current scenario, an expected action for the one or more additional vehicles, wherein the intent score is based on a difference between the expected action of the first vehicle and an actual action of the first vehicle.

15. The system of claim 11, wherein the program instructions, when executed by the processor, are further configured to the processor to:
- prevent, in response to the intent score being above the threshold, the horn device from sounding a general broadcast horn, wherein the horn device is configured to make a noise in response to the activation.

16. A computer program product, the computer program product comprising a computer readable storage medium having program instructions embodied therewith, the program instructions executable by a processing unit to cause the processing unit to:
- identify, by a sending vehicle, one or more additional vehicles in a vicinity of the sending vehicle, including a first vehicle;
- monitor a set of data related to a current scenario for the sending vehicle;
- determine, based on the current scenario, an intent score for the sending vehicle;
- activate a horn device associated with the sending vehicle;
- determine, in response to the activating, the intent score is above an intent threshold for the first vehicle;
- generate, in response to the intent score being above the intent threshold, a message; and
- send, to a target vehicle, the message.

17. The computer program product of claim 16, wherein the intent score represents a confidence that a user in the sending vehicle intends to send a particular message to a particular target.

18. The computer program product of claim 17, wherein the intent score includes a zone score the represents a likelihood the particular target will correctly interpret the particular message, a message score that represents the particular message is intended to be sent by the user, and a target score that represents the user intends the particular target to receive the particular message.

19. The computer program product of claim 16, wherein the program instructions, when executed by the processing unit, are further configured to the processing unit to:
- determine, based on the current scenario, an expected action for the one or more additional vehicles, wherein the intent score is based on a difference between the expected action of the first vehicle and an actual action of the first vehicle.

20. The computer program product of claim 16, wherein the program instructions, when executed by the processing unit, are further configured to the processing unit to:
- initiate, in response to the determination the intent score is below the threshold, the horn device to emit a general broadcast horn sound.

* * * * *